Feb. 20, 1951 A. E. McGLINCHEY 2,542,693
DENTAL HANDPIECE
Filed July 31, 1946
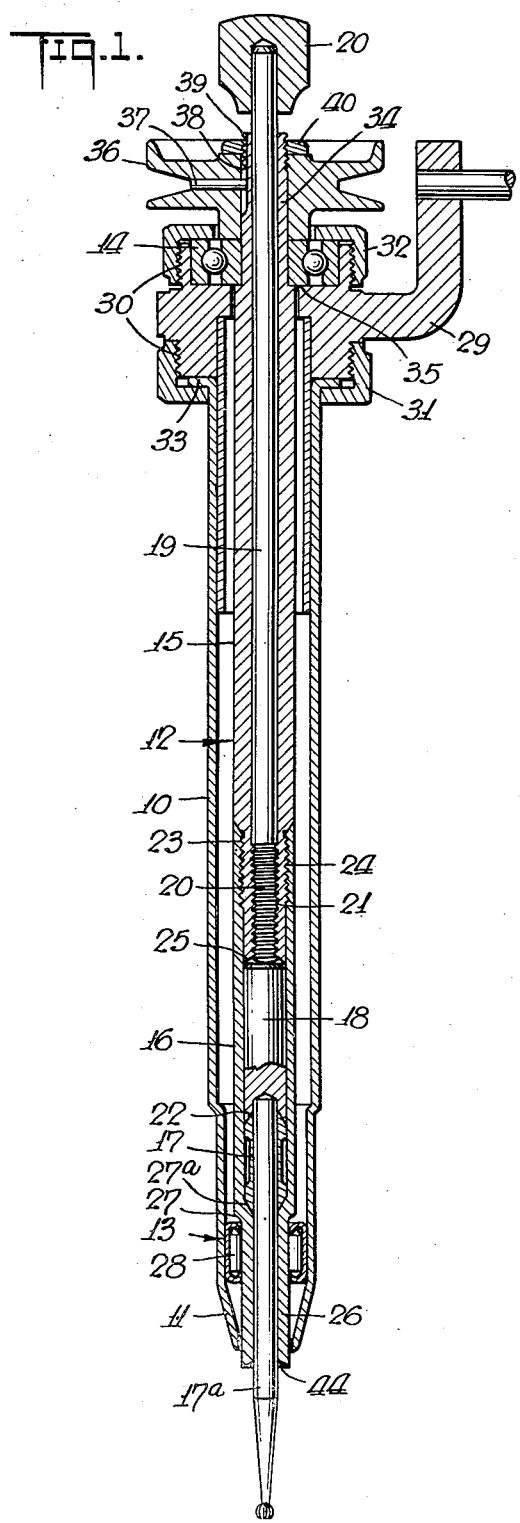
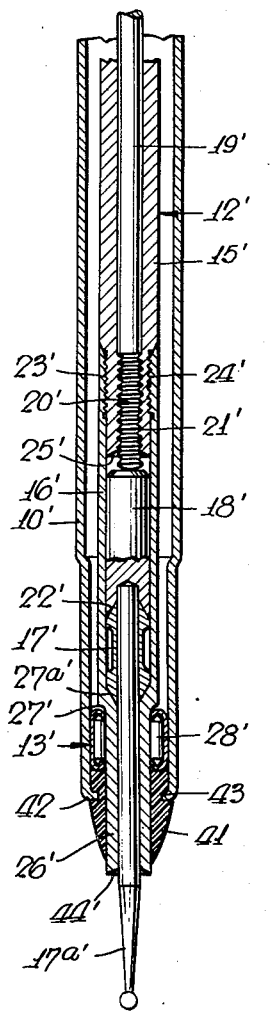
INVENTOR
Arthur E. McGlinchey
BY
Dean Fairbank & Hirsch
ATTORNEYS Patented Feb. 20, 1951

2,542,693

UNITED STATES PATENT OFFICE 2,542,693

DENTAL HANDPIECE

Arthur E. McGlinchey, New York, N. Y., assignor to M. K. Manufacturing Corp., New York, N. Y., a corporation of New York Application July 31, 1946, Serial No. 687,335

3 Claims. (Cl. 32—26)

It is among the objects of my invention to provide a dental handpiece which substantially eliminates wear due to sliding friction and still maintains rigid, radial support for the spindle, which substantially obviates the entrance into the handpiece of foreign matter and the parts of which may be easily disassembled for cleaning, sterilizing or repair and as easily reassembled.

In the accompanying drawings in which are shown one or more of various possible embodiments of the several features of my invention, Fig. 1 is a cross-sectional view through the axis of one embodiment of the invention, and Fig. 2 is a fragmentary cross-sectional view through the axis of another embodiment of the invention.

Referring now to the drawings, the dental handpiece includes a casing preferably comprising a barrel 10, a supporting frame 29 for said handpiece and union nuts 31 and 32, said barrel 10 having in one embodiment of the invention, a frusto-conical shaped nose 11 unitary therewith, said barrel containing a hollow spindle 12, rotatably mounted in anti-friction bearings 13 and 14, said spindle preferably consisting of a drive shaft 15 and a chuck shell 16 containing a clamping device consisting of a collet 17 and collet closer 18. A chuck rod 19 extends longitudinally through drive shaft 15 and is manually rotatable therein by means of knob 20 affixed to the chuck rod 19 at the head or pulley end of said handpiece.

The nose or front end of said chuck rod 19 has external screw threads 20 engaging internal screw threads 21 on the inside of drive shaft 15. Chuck rod 19 may be turned so that it can move forward or backward, thereby to exert greater or lesser pressure against the collet closer 18 within said chuck shell 16. Collet closer 18 is formed with a socket 22 integral therewith at its forward end which serves either to tighten or loosen the collet 17 to clamp or release the shaft of the drill or other tool 17ª which extends through the collet. Chuck shell 16 has internal screw threads 23 for engagement with the external screw threads 24 at the tip 25 of the drive shaft 15. The chuck shell has a reduced portion 26 at the nose thereof forming a shoulder 27 which is immediately in front of said clamping device.

Anti-friction bearing 13 is removably mounted within said barrel 10 as close as possible to the frusto-conical nose 11 of said barrel and preferably contains needle roller bearings 28. The bearing 13 surrounds the reduced portion 26 of said chuck shell and is in contact on its front side with the frusto-conical nose 11 which acts as a stop for said bearing, and on its rear side with the shoulder 27 formed by the root of the reduced portion 26 of said chuck shell 16. This construction, in addition to providing almost frictionless rotation, prevents axial movement forward of spindle 12. The rear face 27ª of shoulder 27 serves as the stop for the collet 17.

A frame part 29 which acts as a support for the handpiece, is formed with screw threaded nipples 30 which coact respectively with union nuts 31 and 32. Union nut 31 clamps an outturned flange 33 at the rear end of barrel 10 to the underside of frame 29. The upper or end bearing 14, preferably a ball bearing, as shown, surrounds the reduced portion 34 of said spindle at its head or pulley end and is in contact with shoulder 35 formed by such reduced portion 34. Union nut 32 clamps said upper bearing 14 to the upper side of frame 29 and thereby prevents axial movement rearward of the spindle.

A pulley 36 surrounds the reduced upper end 34 of said spindle, said pulley containing a key pin 37 insertable into a keyway 38 in said reduced spindle end to key the parts together. The pulley end of said spindle has external screw threads 39 on which is screwed a lock nut 40 for holding said pulley 36 against ball bearing 14.

In the modified form of Fig. 2, corresponding parts have the same reference numerals primed.

Here the nose design includes a heat and oil resisting rubber or plastic frusto-conical shaped grommet 41 affixed to the front of the barrel 10' and protruding therefrom, said holding means consisting of an inwardly turned rim 42 of the barrel 10' fitting into a peripheral groove 43 in said grommet. The grommet surrounds the reduced end 26' of the chuck shell and is forward of the front bearing 13'.

To assemble the handpiece of either embodiment, ball bearing 14 is placed on the reduced rear portion 34 of drive shaft 15 so that it is in contact with shoulder 35. The tip 25 of the drive shaft is inserted through frame 29. Union nut 32 is then placed over said ball bearing 14 and screwed to frame 29. Pulley 36 is keyed at 38 upon the drive shaft 15. Lock nut 40 is then screwed on threads 39. Chuck rod 19 is inserted through the hollowed drive shaft so that its external screw threads 20 engage screw threads 21 on the interior of the tip 25 of the drive shaft 15. Chuck shell 16 containing the collet 17 and collet closer 18 is affixed to the tip 25 of the drive shaft by means of screw threads 23 and 24 and roller bearing 13 is passed over the reduced nose portion of the chuck shell. Barrel 10 is then slipped over the assembled spindle and securely affixed to frame 29 by means of union nut 31.

Torque applied to pulley 36 causes the spindle to rotate in anti-friction bearings 13 and 14, thereby rotating the tool held in the clamping device.

The tool opening in the nose of the spindle preferably has beveled edges 44, 44'. Centrifugal action resulting from the rotation of said spindle causes the beveled edges to throw off foreign matter resulting from the operations being performed and thereby prevents clogging of the handpiece.

According to the invention, effective rigid radial support is thus maintained for the spindle at a point as close as practicable to the application of the working load, which materially reduces vibration of the rotating spindle and tool contained therein. This support preferably consists of needle roller bearings which greatly decrease wear due to sliding friction and also permits the maximum size shaft in a handpiece of relatively small diameter. The tool clamping collet 17 is, as shown, immediately to the rear of the needle roller bearing.

The ball bearing in the head or pulley end of the handpiece offers axial restraint to the spindle so that end play is practically eliminated.

When it is desired to disassemble the handpiece for cleaning, sterilization or repairs, all that it is necessary to do is to unscrew union nut 31 from the underside of frame 29. This permits the removal of barrel 10, thereby exposing spindle 12 and the needle roller bearing 13 at the front end thereof. Said bearing is thereupon removed.

Union nut 32 is then unscrewed. This permits the withdrawal from the frame 29 of spindle 12 containing the collet 17, collet closer 18 and chuck rod 19, together with ball bearing 14 and pulley 36 without the necessity for separating the pulley or bearing from the spindle.

Adaptations of the handpiece construction and designs described above and shown in the accompanying drawings are contemplated for use in laboratory, commercial and so-called homecraft application, as well as in the dental field.

As many changes could be made in the above construction and many apparently widely different embodiments of this invention could be made without departing from the scope of the claims, it is intended that all matters contained in the above description or shown in the accompanying drawings shall be interpreted as illustrative and not in a limiting sense.

Having thus described my invention, what I claim as new and desire to secure by Letters Patent of the United States is:

1. A dental handpiece comprising a spindle, anti-friction bearings therefor respectively near the forward and rear ends thereof, a casing means about said spindle retaining said bearings, said casing having a frusto-conical shaped nose which acts as a stop for the anti-friction bearing near the forward end of the spindle, said spindle having a reduced diameter at the forward and rear ends thereof, thereby forming a shoulder at each end of said spindle, the shoulder formed by the reduction of the forward end being in contact with the front bearing, thereby preventing forward motion of said spindle in the casing, the bearing at the rear end of said spindle being in contact with the shoulder formed at that end, a supporting frame for said handpiece, a union nut holding said end bearing against said supporting frame, thereby preventing rearward motion of said spindle in the casing, and means for removably affixing a tool to the front end of said spindle.

2. A dental handpiece comprising a spindle, said spindle being reduced at the forward and rear ends thereof, thereby forming shoulders at each end of said spindle, anti-friction bearings therefor respectively near the forward and rear ends thereof, said forward bearing being a needle roller bearing, casing means about said spindle retaining said anti-friction bearings, said casing having a frusto-conical shaped nose which acts as a stop for the forward bearing, the shoulder at the forward portion of said spindle also being in contact with said forward bearing, thereby preventing forward motion of said spindle in the casing, the bearing at the rear end of said spindle being in contact with the rear shoulder, a supporting frame for said handpiece, a union nut holding said rear bearing against said supporting frame, thereby preventing rearward motion of said spindle in the casing, and means for removably affixing a tool to the front end of said spindle.

3. A dental handpiece comprising a removable barrel containing a spindle, the front and rear ends of said spindle being of reduced diameter, thereby forming a shoulder at each end of said spindle, said spindle being rotatably mounted, said mounting means comprising a front bearing containing needle roller bearings, said bearing being located in the front end of said barrel and surrounding the reduced front portion of said spindle, an end bearing surrounding the reduced rear portion of said spindle, means for removably affixing a tool to said spindle, a supporting frame for said handpiece, a union nut clamping said barrel to the underside of said supporting frame, a union nut holding said end bearing against the rear shoulder of said spindle at the driving end of said handpiece, and clamping said end bearing to said supporting frame, the entire handpiece thereby being readily disassembled by merely removing said union nuts.

ARTHUR E. McGLINCHEY.

REFERENCES CITED

The following references are of record in the file of this patent:

UNITED STATES PATENTS

| Number | Name | Date |
|---|---|---|
| 250,677 | Register | Dec. 13, 1881 |
| 1,160,805 | Wood | Nov. 16, 1915 |
| 1,655,659 | Nicolello | Jan. 10, 1928 |

FOREIGN PATENTS

| Number | Country | Date |
|---|---|---|
| 459,485 | Germany | May 7, 1928 |